(12) United States Patent
Chan et al.

(10) Patent No.: US 10,964,029 B2
(45) Date of Patent: Mar. 30, 2021

(54) METHOD OF UPDATING BACKGROUND MODEL AND RELATED DEVICE

(71) Applicant: Realtek Semiconductor Corp., HsinChu (TW)

(72) Inventors: Shang-Lun Chan, Hsinchu (TW); Tsung-Hsuan Li, Taichung (TW); Chao-Hsun Yang, New Taipei (TW); Shih-Tse Chen, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/653,989

(22) Filed: Oct. 15, 2019

(65) Prior Publication Data
US 2020/0202537 A1    Jun. 25, 2020

(30) Foreign Application Priority Data
Dec. 25, 2018  (TW) .................................. 107146988

(51) Int. Cl.
*G06T 7/215* (2017.01)
*G06T 7/90* (2017.01)
*G06T 7/136* (2017.01)
*G06T 7/11* (2017.01)

(52) U.S. Cl.
CPC ............... *G06T 7/215* (2017.01); *G06T 7/11* (2017.01); *G06T 7/136* (2017.01); *G06T 7/90* (2017.01); *G06T 2207/10024* (2013.01); *G06T 2207/20081* (2013.01)

(58) Field of Classification Search
CPC ..... G06T 7/20–292; G06T 7/136; G06T 7/11; G06T 7/90; G06T 2207/10024; G06T 2207/20081
See application file for complete search history.

(56) References Cited

U.S. PATENT DOCUMENTS

2015/0339828 A1* 11/2015 Djelouah ............... G06T 7/11
382/173
2017/0317740 A1* 11/2017 Basu Mallick .... H04B 7/15557

* cited by examiner

*Primary Examiner* — Sean T Motsinger
(74) *Attorney, Agent, or Firm* — Winston Hsu (57) ABSTRACT

A method of updating background model for an image processing device is disclosed. The method includes receiving at least a background image, counting a number of occurrences of a color of each pixel of the background image according to a color information of each pixel of the at least a background image, to establish a background model including a statistical color information about the color and the number of occurrences of the color, receiving a current image, and determining whether to update the number of occurrences of the color in the background model corresponding to a color of each pixel of the current image according to a color information of each pixel of the current image and a result of comparing a random number with a threshold.

10 Claims, 5 Drawing Sheets

METHOD OF UPDATING BACKGROUND MODEL AND RELATED DEVICE

BACKGROUND OF THE INVENTION

1. Field of the Invention

The present invention relates to a method of updating background model, and more particularly, to a method of updating background model with random number generator, so as to reduce storage space for the background model.

2. Description of the Prior Art

Conventional video surveillance products, such as surveillance systems, mobile phones, and webcams, are mostly provided with motion detection. In a word, the motion detection operation includes steps of: using an image stream provided by video interface of a device as an input, establishing a background model based on the characteristics of the image stream in a period of training (continuous time sequence), and comparing each pixel of a current image with the background model for the detecting moving objects, whereby the motion detection operation outputs a binary image, white for moving objects and black for background (non-moving objects).

Though the conventional background model established via a Gaussian Mixed Model (GMM) or a codebook, can detect accurate motion images and filter out periodically moving objects for avoiding misjudgment and ghosting problems; however the hardware architecture for practice is too costly. For example, in the GMM method, the floating-point number of the background model is too high and the output effect is not easy to control. In the codebook method, although the floating-point operation is small, a large amount of background data needs to be recorded. Note that, when the time for the background record is long for recording objects with long moving periods in the background model, a large amount of temporary storage space is required, which wastes a great amount of space of the register for establishing a high accuracy and effective background model. In addition, with such manner, a large number of floating point operation increase complexity of computation.

SUMMARY OF THE INVENTION

It is therefore an objective to provide a method of updating background model to solve the above problem.

The present invention discloses a method of updating background model, for an image processing device. The method comprises receiving at least a background image, counting a number of occurrences of a color of each pixel of the background image according to a color information of each pixel of the at least a background image, to establish a background model including a statistical color information about the color and the number of occurrences of the color, receiving a current image, and determining whether to update the number of occurrences of the color in the background model corresponding to a color of each pixel of the current image according to a color information of each pixel of the current image and a result of comparing a random number with a threshold.

The present invention discloses an image processing device. The image processing device comprises a processing unit, for executing the following steps: receiving at least a background image, counting a number of occurrences of a color of each pixel of the background image according to a color information of each pixel of the at least a background image, to establish a background model including a statistical information about the color and the number of occurrences of the color, receiving a current image, and determining whether to update the number of occurrences of the color in the background model corresponding to a color of each pixel of the current image according to a color information of each pixel of the current image and a result of comparing a random number with a threshold, and a storage unit, coupled to the processing unit, for storing the background image, the current image, the color information and the statistical information.

The present invention discloses an image processing device. The image processing device comprises a processing unit, for executing a program code, and a storage unit, coupled to the processing unit, for storing the program code, wherein the program code instructs the processing unit to perform the following steps: receiving at least a background image, counting a number of occurrences of a color of each pixel of the background image according to a color information of each pixel of the at least a background image, to establish a background model including a statistical information about the color and the number of occurrences of the color, receiving a current image, and determining whether to update the number of occurrences of the color in the background model corresponding to a color of each pixel of the current image according to a color information of each pixel of the current image and a result of comparing a random number with a threshold.

These and other objectives of the present invention will no doubt become obvious to those of ordinary skill in the art after reading the following detailed description of the preferred embodiment that is illustrated in the various figures and drawings.

DETAILED DESCRIPTION

The present invention aims at reducing complexity of computation and storage space required by the background model, to realize the background model establishment and updating with low-cost hardware architecture.

Figure 1:
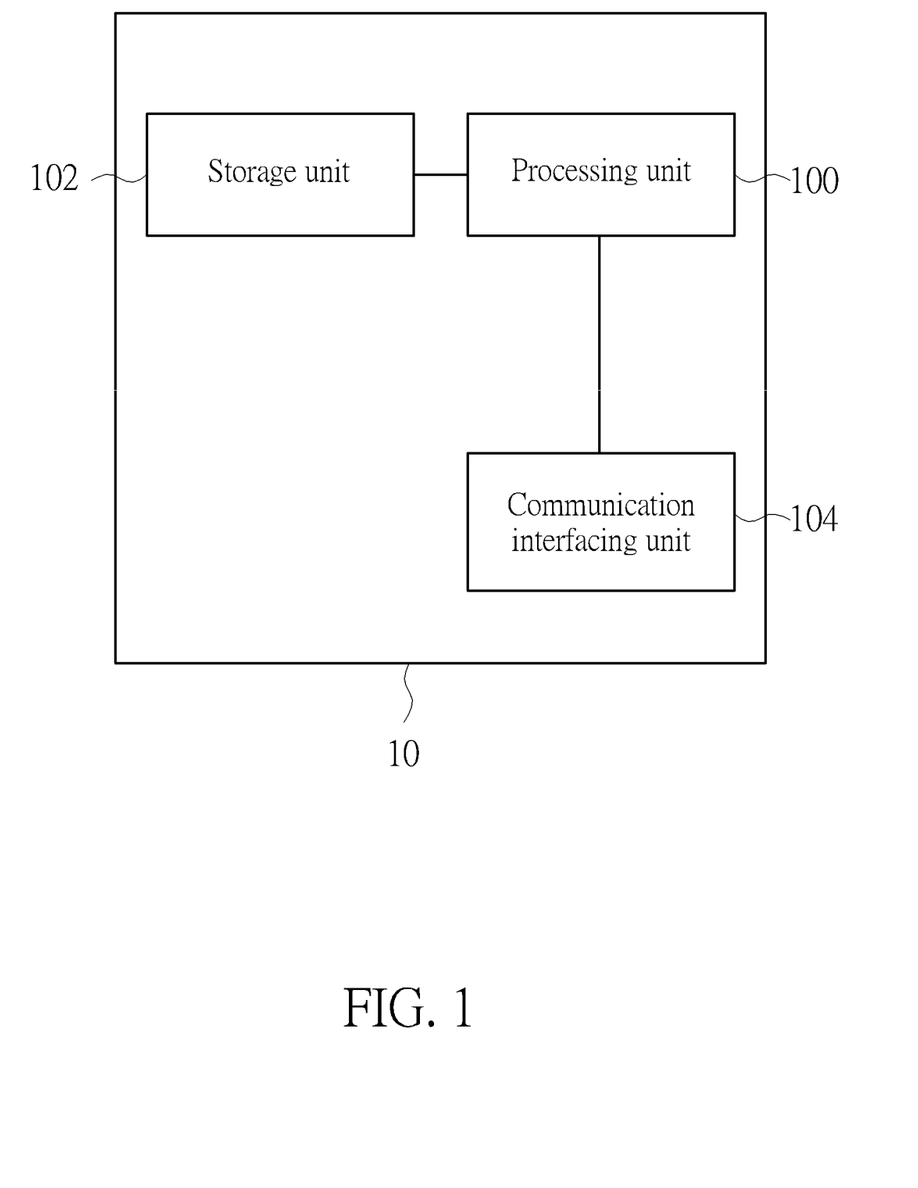
FIG. 1 is a schematic diagram of an image processing device according to the present disclosure.

FIG. 1 is a schematic diagram of an image processing device 10. The image processing device 10 can be a personal computer, a camera of a notebook, surveillance systems, mobile phones, or webcams. The image processing device 10 may include a processing unit 100 such as a microprocessor or Application Specific Integrated Circuit (ASIC), a storage unit 102 and a communication interfacing unit 104. The storage unit 102 may be any data storage device that can store program code, images and color information of the images, for access by the processing unit 100. Examples of the storage unit 102 include but are not limited to a subscriber identity module (SIM), read-only memory (ROM), flash memory, random-access memory (RAM), CD-ROMs, magnetic tape, hard disk, and optical data storage device.

The communication interfacing unit 104 is preferably a transceiver with wired or wireless, and can exchange image data with other image processing devices according to processing results of the processing unit 100.

Figure 2:
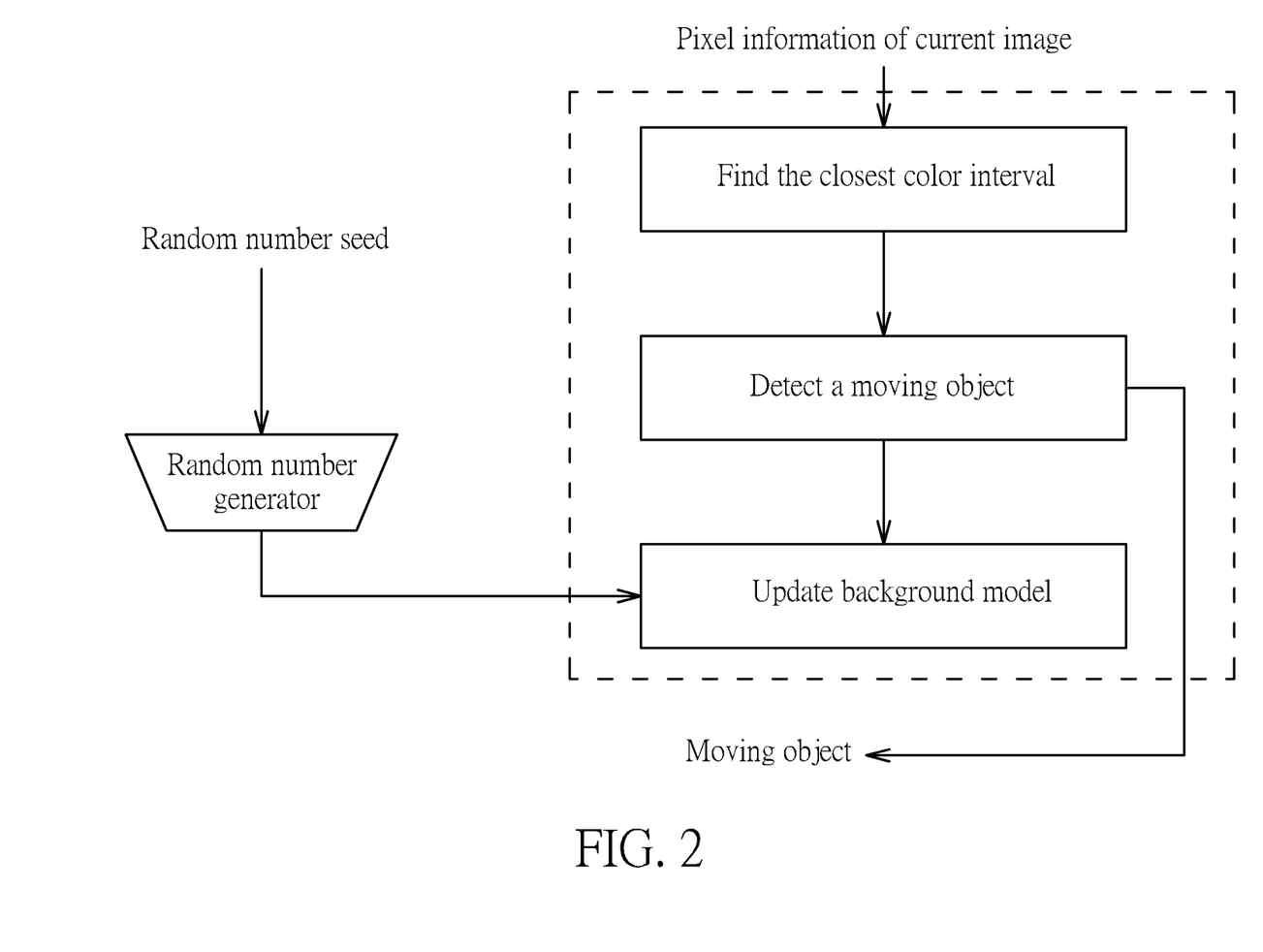
FIG. 2 is a flowchart of an exemplary process according to the present disclosure.

FIG. 2 is a flowchart of an exemplary process according to the present disclosure. The image processing device 10 utilizes images (hereafter called background images) received in continuous time sequence (e.g. frame) to establish background model, which records color information of each pixel of the background image. The image processing device 10 further receives color information of each pixel of a current image, and then finds the closest color quantization interval according to the color information of the background model, which is called as background model establishment operation. In addition, the image processing device 10 performs moving estimation for an object in the current image with the color quantization interval, which is called as motion detection operation. Finally, the image processing device 10 performs to update background model according to a random number.

Detailed description for the background model establishment operation, the motion detection operation, and the background model updating operation is as follows. The background model is used for recording the color information that appears in each pixel of the image. Therefore, the register needs to store statistical information about a number of occurrences of the color information of each pixel in a period of time. Note that, with the conventional background model establishment operation, a statistical information $size_{bm}^{pixel}$ about the number of occurrences of the color information of each pixel is required of large storage space (due to the color of the pixel is recorded every time it appears), as represented by the following equation 1.1, where c is a number of channels in the color space, r is a range of a channel, v is a space required for storing the number of occurrences. With conventional background model establishment in a hardware, range r is required of fixed-point calculation has values from 0 to 255, and the larger the space v is, the longer time (e.g. the frame) is taken for recording the background images, so as to obtain complete information of each pixel for background determination. In other words, when the range r and the space v are getting larger, the storage space is increased accordingly, which is disadvantageous for hardware implementation.

$$size_{bm}^{pixel} = c * r * v \quad \text{(Equation 1.1)}$$

The present invention proposes a method for storing the statistical information on the number of occurrences of colors based on a histogram, that is, the color space quantization, so that the storage space required for each pixel is reduced to $size_{hist}^{pixel}$, as represented by the following equation 1.2, where q is the quantization step, the larger the quantization step q is, the smaller a number of colors is, so the storage space is reduced accordingly. For example, the range of a single channel is from 0 to 255. Assuming the quantization step q=16, the range of each color quantization interval is 16 (256/16=16). That is, the range of the single channel from 0 to 255 is represented by 16 colors. For example, the first representative color range is 0-15, the second representative color range is 16-31, and so on. Briefly, for the background model information with the histogram, each color quantization corresponds to a color quantization interval $b_{in}$ of the histogram, and the number of occurrences is mapped to the value of the color quantization interval $b_{in}$, as represented by the following equation 1.3, where $Color_{i,j}^{c}$ represents color information of channel c of a pixel position (i, j) of an image, and $q_c$ represents the quantization step in channel c.

$$size_{hist}^{pixel} = c * \frac{r}{q} * v = c * r' * v \quad \text{(Equation 1.2)}$$

$$Hist_p^c = \text{occurence } number_p^c, \ p = \frac{Color_{i,j}^c}{q_c} \quad \text{(Equation 1.3)}$$

Since Y channel has the characteristics (brightness information) that are more obvious to the human eye, color information of Y channel of the YUV color space is utilized in this article for illustrating color information of a pixel. In addition, the background model established based on the histogram for motion detection operation is applied. However, the color space type such as YUV, RGB, and HSV for illustrating the color information or a way of quantization is not limited in the present invention.

As can be seen, by introducing the concept of color space quantization, the color range can be effectively compressed and the storage cost can be saved. In the motion detection operation, whenever a new image is received, the image processing device 10 finds the closest two color quantization intervals idx1 and idx2, as represented by the following equation 1.4, for each pixel according to the color information of each pixel and the previously established background model. To increase the tolerance for the color quantization errors, the closest two color quantization intervals are used for motion detection. For example, assuming q=32, when the value of the pixel I(i, j)=31, although it belongs to the 0th representative color ranged from 0 to 31), it is closer to the first representative color ranged from 32 to 63. That is, idx1=0 and idx2=1 are selected. When the value of the pixel I(i, j)=65, although it belongs to the second representative color ranged from 64 to 95, it is closer to the first representative color ranged from 32 to 63). That is, idx1=2 and idx2=1 are selected. Therefore, by taking out the two closest color quantization intervals idx1 and idx2, color quantization error can be effectively improved.

$$idx1 = \frac{I(i,j)}{q} \quad \text{(Equation 1.4)}$$

$$idx2 = idx1 + 1 \text{ or } idx1 - 1$$

In addition, the image processing device 10 extracts the number of occurrences $Hist_{i,j}^{idx1}$ and $Hist_{i,j}^{idx2}$ of the two closest color quantization intervals idx1 and idx2 from the corresponding color quantization intervals of the background model, for determining whether a moving object is detected. A mechanism for the motion detection is represented as the following equation 2.1:

$$\text{Motin Detection Result} = \begin{cases} \text{Background,} & \text{if } Hist_{i,j}^{idx1} > T \text{ or } Hist_{i,j}^{idx2} > T, \ T \geq 1, T \text{ is background threshold} \\ \text{Motion,} & \text{else} \end{cases} \quad \text{(Equation 2.1)}$$

Figure 4:
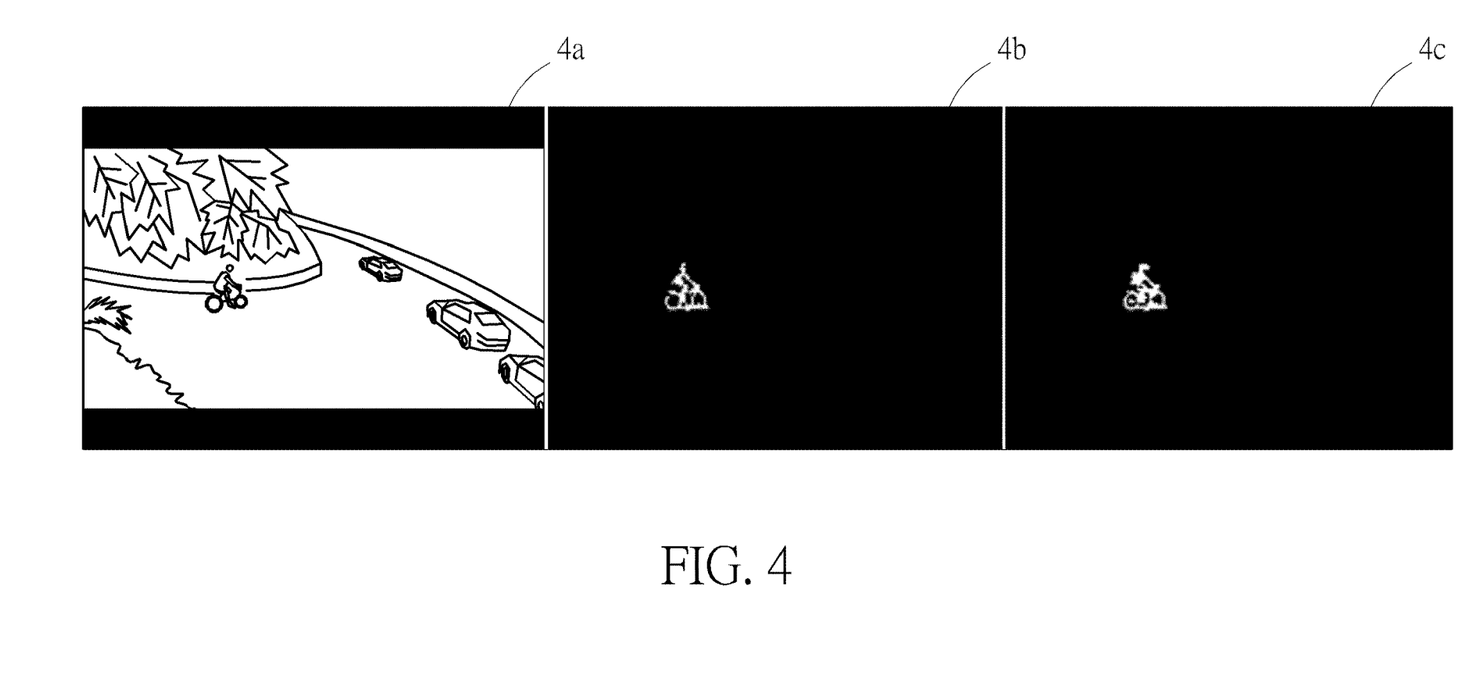
FIGS. 4-5 are schematic diagrams of a motion detecting result according to the present disclosure.
Figure 5:
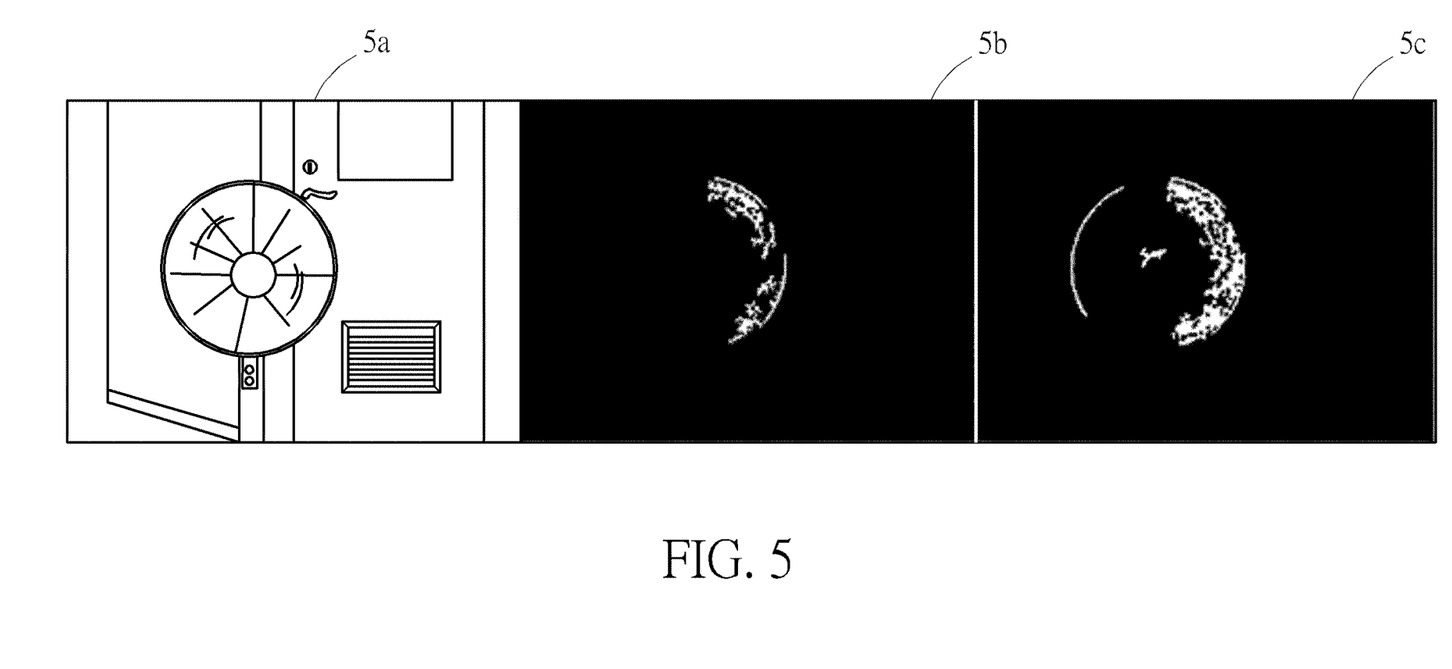

If the occurrence of the color quantization interval of a pixel appears frequently, the image processing device 10 determines that this pixel is a background pixel; otherwise it is a moving pixel. According to the background model establishment operation of the present invention, the image detection result of the current image is shown in FIGS. 4-5. In FIGS. 4-5, the leftmost part is the original image, the middle is the detection result with q=32, and the right side is the detection result with q=16. It can be seen that the compression size affects the sensitivity of motion detection. The smaller of the compression size is (namely more representative colors), the higher the sensitivity of the motion detection. For example, the detection results in FIGS. 4c and 5c have more details than the detection results in FIGS. 4b and 5b. On the other hand, when the compression size is larger (namely less representative color), the sensitivity of the motion detection is reduced, but the storage space is saved. In an embodiment of the present invention, due to different configurations of the hardware, the sensitivity for the motion detection operation could be designed according to the hardware requirements.

Figure 3:
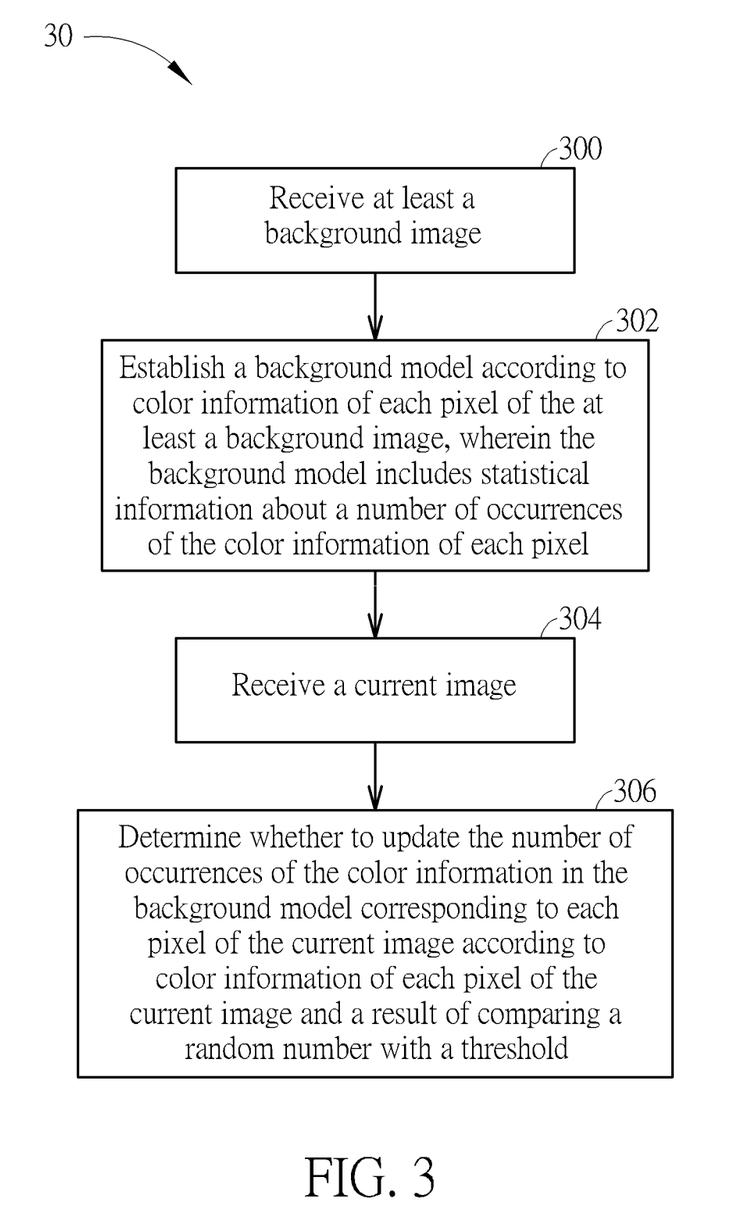
FIG. 3 is a flowchart of updating a background model according to the present disclosure.

Further, one of the objects of the present invention is to reduce the storage space while ensuring the validity of the background model. Please refer to FIG. 3, which is a flowchart of a background model updating process 30 according to an embodiment of the present invention. The background model updating process 30 can be compiled into a program code and stored in the storage unit 102, and includes the following steps:

Step 300: Receive at least a background image.

Step 302: Establish a background model according to color information of each pixel of the at least a background image, wherein the background model includes statistical information about a number of occurrences of the color information of each pixel.

Step 304: Receive a current image.

Step 306: Determine whether to update the number of occurrences of the color information in the background model corresponding to a color of each pixel of the current image according to color information of each pixel of the current image and a result of comparing a random number with a threshold.

According to the background model updating process 30, after the background model is established based on the abovementioned histogram with the color space quantization, the image processing device 10 needs to increase the number of the color quantization intervals of the background model in which the color of the pixel of the current image appears and reduce the number of the color quantization intervals of the background model in which the color of the pixel of the current image does not appear, so as to learn and eliminate new and old background information of the background model. Updating of the background model could be represented as:

$$\text{Hist}_{i,j}^{idx} + v_l, \text{ if } idx=idx1 \text{ or } idx2 \text{ } \text{Hist}_{i,j}^{idx} - v_f, \text{ else} \quad \text{(Equation 3.1)},$$

wherein Vl and vf are positive floating point numbers for adjusting the rate of learning and forgetting the background information. In a word, if the color quantization interval of the pixel of the current image belongs to the two color quantization intervals idx1 and idx2, the number of occurrences of the color quantization interval of the pixel is increased. Conversely, if the color quantization interval of the pixel of current image is not belonged to the two color quantization intervals idx1 and idx2, the number of occurrences of the color quantization interval of the pixel is reduced, so as to realize the background information update.

Besides, the present invention proposes a mechanism to learn and forget the background information with random numbers, so as to effectively reduce the size of the storage space and preserve the high-precision effect of the background model. In order to reduce the number of bits required for storing the background model from m bits to k bits, where m and k are positive integers and 0<k<m. A mechanism for updating the background information is represented as the following equations 3.2 and 3.3:

$$\begin{cases} \text{Hist}_{i,j}^{idx} + 1, & \text{if } idx = idx1 \text{ or } idx2 \text{ and} \\ & \text{rand(seed)} < learn_{thd} \\ \text{Hist}_{i,j}^{idx} - 1, & \text{if } idx \ne idx1 \text{ or } idx2 \text{ and} \\ & \text{rand(seed)} < forget_{thd} \\ \text{Hist}_{i,j}^{idx}, & \text{else} \end{cases} \quad \text{(Equation 3.2)}$$

Motin Detection Result = Background (Equation 3.3)
if $\text{Hist}_{i,j}^{idx1} > T$ or $\text{Hist}_{i,j}^{idx2} > T$, where $T < 2^k$, wherein rand, seed, $learn_{thd}$ and $forget_{thd}$ are related to random number generator, random number seed, learning threshold and forgotten threshold, respectively, and seed>0, $learn_{thd} \geq 0$, and $forget_{thd} \geq 0$. In addition, the learning threshold and the forgotten threshold could be seen as the threshold of the step 306. The rand (seed) is a random number integer with $0 \leq \text{rand (seed)} < 2^r$ and is uniformly distributed, wherein the random number, the learning threshold and the forgotten threshold are integers greater than or equal to zero, and r is a number of bits of the random number (i.e. the larger of r is, the wider range of the random numbers can be). According to equations 3.2 and 3.3, if the color quantization interval of pixel of the current image belongs to the closest two color quantization intervals idx1 and idx2, and the learning threshold $learn_{thd}$ is larger than the random number rand (seed), the number of occurrences of the color quantization interval of the pixel is increased by 1. On the other hand, if the color quantization interval of the pixel of current image does not belong to the closest two color quantization intervals idx1, idx2, and the forgotten threshold $forget_{thd}$ is greater than the random number rand (seed), the number of occurrences of the color quantization interval of the pixel is reduced by 1, thereby implementing the background information update of the background model. Note that, the comparison results between the random number, the learning threshold $learn_{thd}$, and the forgotten threshold $forget_{thd}$, are used for determining whether to update the number of occurrences of the color quantization interval corresponding to the pixel of the current image. In other words, the number of occurrences of the color quantization interval corresponding to the pixel of the current image will not be updated every time. However, as can be seen from the above, in order to make the background model with higher precision, the number N of images needs to be a maximum value, which means that an accurate background model is required of a long time for establishment. Based on the characteristic of random numbers, the longer time of recording the image data, the smaller the error that the statistical information occurs, and thus the background model is closed to the reality.

On the other hand, the larger the values of learning threshold $learn_{thd}$ and forgotten threshold $forget_{thd}$, the condition of that the random number rand (seed) smaller than the learning threshold $learn_{thd}$ or the random number rand (seed) smaller than the forgotten threshold $forget_{thd}$ is easily to fulfill. The probability of increase/decrease in the number of votes of the color quantization interval is therefore increased, so that more storage space is required. On the other hand, the smaller of learning threshold $learn_{thd}$ and forgotten threshold forget$_{thd}$, the probability of increase/decrease in the number of votes is reduced, so the required storage space is less. In the long run, by using the random number generator or random number for updating the color quantization intervals of the background model, the collected statistics are much closed to the real images.

In an embodiment, a linear feedback shift register is used as the random number generator is. The linear feedback shift register is relatively low in cost on the hardware architecture because only bit-wise operation and shift operation are used. Compared to a linear congruential generator, multiplication algorithm is avoided within the linear feedback shift register upon a long cycle period. In this article, the random number generator with different algorithms should not limit the scope of the present invention.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM). In detail, the background model updating process 30 is realized by a hardware circuit, namely the image processing device, wherein the processing unit 100 of the image processing device is designed based on the abovementioned steps and formula, and stores the execution results, such as image, color information and color statistical information, in the storage unit 102.

In conclusion, the present invention provides a method of updating the background model to reduce the storage space required for image data and maintain high accuracy. In detail, the background model is established based on the histogram of the color space quantization, and is updated according to the random number, so as to reduce the number of times of updating the number of occurrences of the color quantization interval, such that the storage space is decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of updating background model, for an image processing device, the method comprising:
   receiving at least a background image;
   counting a number of occurrences of a color of each pixel of the background image according to a color information of each pixel of the at least a background image, to establish a background model including a statistical color information about the color and the number of occurrences of the color;
   receiving a current image; and
   determining whether to update the number of occurrences of the color in the background model corresponding to a color of each pixel of the current image according to a color information of each pixel of the current image and a result of comparing a random number with a threshold.

2. The method of claim 1, wherein the background model includes the number of occurrences of the color of each pixel of the background image in a plurality of color quantization intervals.

3. The method of claim 2, further comprising:
   performing a motion detection operation on the current image, wherein the motion detection operation is used for determining that each pixel of the current image is a background pixel or a moving pixel, and the motion detection operation includes the steps of:
   extracting two closest color quantization intervals according to the color information of a pixel of the current image; and
   determining that the pixel is the background pixel when the number of occurrences of at least one of the two color quantization intervals of the background model is larger than a background threshold, otherwise determining that the pixel is the moving pixel.

4. The method of claim 3, wherein the threshold includes a learning threshold and a forgotten threshold, and determining whether to update the number of occurrences of the color in the background model corresponding to the color of each pixel of the current image according to the color information of each pixel of the current image and the result of comparing the random number with the threshold includes the steps of:
   determining whether a color quantization interval corresponding to the color information of the pixel of the current image is one of the two color quantization intervals;
   increasing the number of occurrences corresponding to the color quantization interval of the pixel of the current image in the background model when the color quantization interval corresponding to the color information of the pixel of the current image is one of the two color quantization intervals, and the random number is smaller than the learning threshold; and
   decreasing the number of occurrences corresponding to the color quantization interval of the pixel of the current image in the background model when the color quantization interval corresponding to the color information of the pixel of the current image is not one of the two color quantization intervals, and the random number is smaller than the forgotten threshold.

5. An image processing device comprising:
   a processing unit, for executing the following steps:
   receiving at least a background image;
   counting a number of occurrences of a color of each pixel of the background image according to a color information of each pixel of the at least a background image, to establish a background model including a statistical information about the color and the number of occurrences of the color;
   receiving a current image; and
   determining whether to update the number of occurrences of the color in the background model corresponding to a color of each pixel of the current image according to a color information of each pixel of the current image and a result of comparing a random number with a threshold; and
   a storage unit, coupled to the processing unit, for storing the background image, the current image, the color information and the statistical information.

6. The image processing device of claim 5, wherein the background model includes the number of occurrences of the color of each pixel of the background image in a plurality of color quantization intervals.

7. The image processing device of claim 6, wherein the processing unit further executes the following steps:
   performing a motion detection operation on the current image, wherein the motion detection operation is used for determining that each pixel of the current image is a background pixel or a moving pixel, and the motion detection operation includes the steps of:

extracting two closest color quantization intervals according to the color information of a pixel of the current image; and determining that the pixel is the background pixel when the number of occurrences of at least one of the two color quantization intervals of the background model is larger than a background threshold, otherwise determining that the pixel is the moving pixel.

8. The image processing device of claim 7, wherein the threshold includes a learning threshold and a forgotten threshold, and the processing unit further executes the following steps:

determining whether a color quantization interval corresponding to the color information of the pixel of the current image is one of the two color quantization intervals;

increasing the number of occurrences corresponding to the color quantization interval of the pixel of the current image in the background model when the color quantization interval corresponding to the color information of the pixel of the current image is one of the two color quantization intervals, and the random number is smaller than the learning threshold; and decreasing the number of occurrences corresponding to the color quantization interval of the pixel of the current image in the background model when the color quantization interval corresponding to the color information of the pixel of the current image is not one of the two color quantization intervals, and the random number is smaller than the forgotten threshold.

9. The image processing device of claim 5, wherein the random number is generated by a random number generator, which includes a linear feedback shift register.

10. An image processing device comprising:

a processing unit, for executing a program code; and a storage unit, coupled to the processing unit, for storing the program code, wherein the program code instructs the processing unit to perform the following steps:

receiving at least a background image;

counting a number of occurrences of a color of each pixel of the background image according to a color information of each pixel of the at least a background image, to establish a background model including a statistical color information about the color and the number of occurrences of the color;

receiving a current image; and determining whether to update the number of occurrences of the color in the background model corresponding to a color of each pixel of the current image according to a color information of each pixel of the current image and a result of comparing a random number with a threshold.

* * * * *